United States Patent
Jeong et al.

(10) Patent No.: US 7,778,208 B2
(45) Date of Patent: Aug. 17, 2010

(54) WIRELESS COMMUNICATION SYSTEM FOR TIME DIVISION DUPLEX

(75) Inventors: Moon Suk Jeong, Gyunggi-Do (KR); Nam Heung Kim, Gyunggi-Do (KR); Jeong Hoon Kim, Gyunggi-Do (KR); Eung Ju Kim, Gyunggi-Do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 84 days.

(21) Appl. No.: 12/191,173

(22) Filed: Aug. 13, 2008

(65) Prior Publication Data
US 2009/0213768 A1 Aug. 27, 2009

(30) Foreign Application Priority Data
Feb. 21, 2008 (KR) .................. 10-2008-0015750

(51) Int. Cl.
*H04J 3/00* (2006.01)
*H04L 5/14* (2006.01)
*H04B 1/44* (2006.01)

(52) U.S. Cl. .................. 370/280; 370/294; 455/78; 455/550.1

(58) Field of Classification Search .................. 370/276, 370/280, 294; 375/345; 455/73, 78, 130, 455/131, 550.1, 552.1
See application file for complete search history.

(56) References Cited

U.S. PATENT DOCUMENTS

| 5,339,083 | A | | 8/1994 | Inami | |
|---|---|---|---|---|---|
| 5,590,412 | A | * | 12/1996 | Sawai et al. | 455/82 |
| 5,923,647 | A | * | 7/1999 | Dolman et al. | 370/280 |
| 2005/0286448 | A1 | * | 12/2005 | Proctor et al. | 370/279 |
| 2007/0173209 | A1 | * | 7/2007 | Kim et al. | 455/78 |
| 2009/0086658 | A1 | * | 4/2009 | Teillet et al. | 370/310 |

FOREIGN PATENT DOCUMENTS

| JP | 57069939 A | * | 4/1982 |
|---|---|---|---|
| JP | 2004-254009 A | | 9/2004 |

\* cited by examiner

*Primary Examiner*—Chi H Pham
*Assistant Examiner*—Ahmed Elallam
(74) *Attorney, Agent, or Firm*—Lowe Hauptman Ham & Berner LLP

(57) ABSTRACT

Disclosed is a wireless communication system applicable to a time-division duplex transceiver system. The time-division duplex mobile communication system can achieve miniaturization, low power consumption and low costs by using a frequency conversion circuit including a mixer and an intermediate frequency (IF) circuit for both transmitter and receiver, and also can cope with multi-band, multi-application systems by using a broadband amplifier, a variable IF filter and a variable gain amplifier.

11 Claims, 4 Drawing Sheets

WIRELESS COMMUNICATION SYSTEM FOR TIME DIVISION DUPLEX

CROSS-REFERENCE TO RELATED APPLICATIONS

This application claims the priority of Korean Patent Application No. 2008-15750 filed on Feb. 21, 2008, in the Korean Intellectual Property Office, the disclosure of which is incorporated herein by reference.

BACKGROUND OF THE INVENTION

1. Field of the Invention

The present invention relates to wireless communication systems which are applicable to time division duplex transceiver systems, and more particularly, to a time-division duplex wireless communication system capable of achieving miniaturization, low power consumption and low costs by using a frequency conversion circuit including a mixer, and an intermediate frequency (IF) circuit for both transmitter and receiver.

2. Description of the Related Art

Mobile communications services have recently provided a variety of services such as broadcasting services, multimedia video services, e-mail services and multimedia message services, investigating possibilities of creating a new market. These mobile communication services aim at realizing future-oriented mobile communication systems that provide data, voice and video services at a high speed when users of mobile communication terminals are not only stationary but also moving.

The users of mobile communication services demand the same quality of wireless multimedia services as in a wired broadband network. The users also require various quality of service (QoS) such as a high data rate or a low data rate and real-time or non-real-time in data transmitter/receiver.

The 4$^{th}$ generation mobile communication aims for fixed-mobile convergence (FMC)-based multimedia communication by achieving a data transmitter rate of maximum 100 Mbps when users of mobile communication terminals are moving at a high speed, and a data transmitter rate ranging from 155 Mbps to 1 Gbps when the users are moving at a low speed or are stationary. Accordingly, high channel capacity is required in data transmitter/receiver, and therefore broadband or multi-input multi-output (MIMO) technologies are needed.

More frequency bands are being used in communication due to the development of the wireless communication technologies, accordingly requiring a multi-band transceiver to be implemented as one chip and massive data to be transmitted at a high speed. An example of a related art transceiver system will now be described with reference to FIG. 1.

FIG. 1 is a block diagram of a related art transceiver system.

Referring to FIG. 1, the related art transceiver system includes a local oscillator 5, a transmitter 10 and a receiver 20.

The transmitter 10 includes a transmitter filter 11 passing a transmitter intermediate frequency (IF) signal in a low frequency band; a transmitter amplifier 12 amplifying the transmitter IF signal from the transmitter filter 11; a transmitter mixer 13 mixing the transmitter IF signal with an oscillation signal of the local oscillator 5 to convert the transmitter IF signal into a transmitter radio frequency (RF) signal; and a power amplifier 14 amplifying power of the transmitter RF signal from the transmitter mixer 13.

The receiver 20 includes an RF amplifier 21 amplifying an incoming receiver RF signal; a receiver mixer 22 mixing the receiver RF signal from the RF amplifier 21 with an oscillation signal from the local oscillator 5 to convert the receiver RF signal into a receiver IF signal; an IF filter 23 passing the receiver IF signal from the receiver mixer 22 in a low frequency band; and an IF amplifier 24 amplifying the receiver IF signal from the IF filter 23.

However, the related art transceiver system illustrated in FIG. 1 has limitations in achieving miniaturization, low power consumption and low manufacturing costs because the transmitter 10 and the receiver 20 are separately implemented therein.

That is, the related art transceiver system fails to overcome the above limitations in providing a high-speed large-capacity data communication service in multi-band, multi-application systems.

SUMMARY OF THE INVENTION

An aspect of the present invention provides a wireless communication system for time division duplex capable of achieving miniaturization, low power consumption and low costs by using a frequency conversion circuit including a mixer, and an intermediate frequency (IF) circuit for both transmitter and receiver, and of coping with multi-band, multi-application systems by employing a broadband amplifier, a variable IF filter and a variable gain amplifier.

According to an aspect of the present invention, there is provided a wireless communication system for time division duplex including: a bidirectional frequency conversion unit bidirectionally converting a receiver (Rx) signal and a transmitter (Tx) signal, and including a first connection terminal connected to an Rx input terminal and a Tx output terminal, and a second connection terminal; a common intermediate frequency (IF) circuit unit processing an Rx signal input through the second connection terminal of the bidirectional frequency conversion unit or a Tx signal input through a Tx input terminal; an Rx switching circuit unit switched ON in an Rx operation, and including a first Rx switch connected between the Rx input terminal and the first connection terminal of the bidirectional frequency conversion unit, a second Rx switch connected between the second connection terminal of the bidirectional frequency conversion unit and an input terminal of the common IF circuit unit, and a third Rx switch connected between an output terminal of the common IF circuit unit an Rx output terminal; and a Tx switching circuit unit switched ON in a Tx operation, and including a first Tx switch connected between the Tx input terminal and the input terminal of the common IF circuit unit, a second Tx switch connected to a bypass path connecting the input terminal of the common IF circuit unit with the output terminal of the common IF circuit unit, and a third Tx switch connected between the first connection terminal of the bidirectional frequency conversion unit and the Tx output terminal. The Rx switching circuit unit and the Tx switching circuit unit operate in a time-division manner.

The wireless communication system for time division duplex may further include a switching control unit controlling the Rx switching circuit unit and the Tx switching circuit unit in a time-division manner.

The wireless communication system for time division duplex may further include an Rx input circuit unit connected between the Rx input terminal and the first Rx switch to process an Rx signal input from the Rx input terminal.

The wireless communication system for time division duplex may further include a Tx output circuit unit connected between the third Tx switch and the Tx output terminal to amplify a Tx signal input through the third Tx switch and output the amplified Tx signal to the Tx output terminal.

The common IF circuit unit may include: a common filter passing an input signal in a low frequency band; and a common amplifier amplifying a signal input from the common filter.

The common filter may be a variable filter varying a passband in response to a band control signal.

The common amplifier may be a variable gain amplifier varying a gain in response to a gain control signal.

The variable frequency conversion unit may use one of a direct conversion method, a double conversion method and a heterodyne conversion method.

The Rx input circuit unit may include: an Rx amplifier amplifying an Rx signal input through the Rx input terminal; and an Rx filter passing the Rx signal from the Rx amplifier 110 in a preset low frequency band.

The Rx amplifier may be a broadband amplifier passing different frequency band signals.

The bidirectional frequency conversion unit may include a passive mixer having a bidirectional characteristic.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
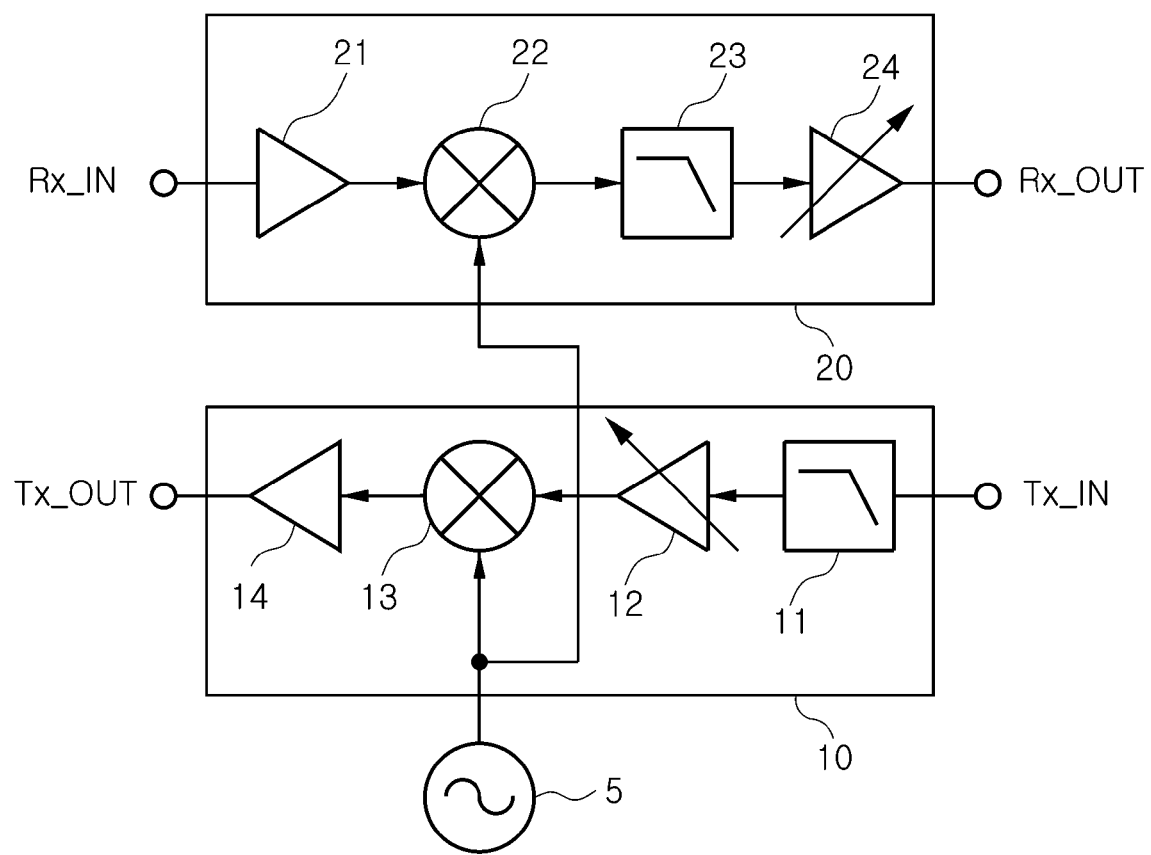
FIG. 1 is a block diagram of a related art transceiver system.

Exemplary embodiments of the present invention will now be described in detail with reference to the accompanying drawings.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

Figure 2:
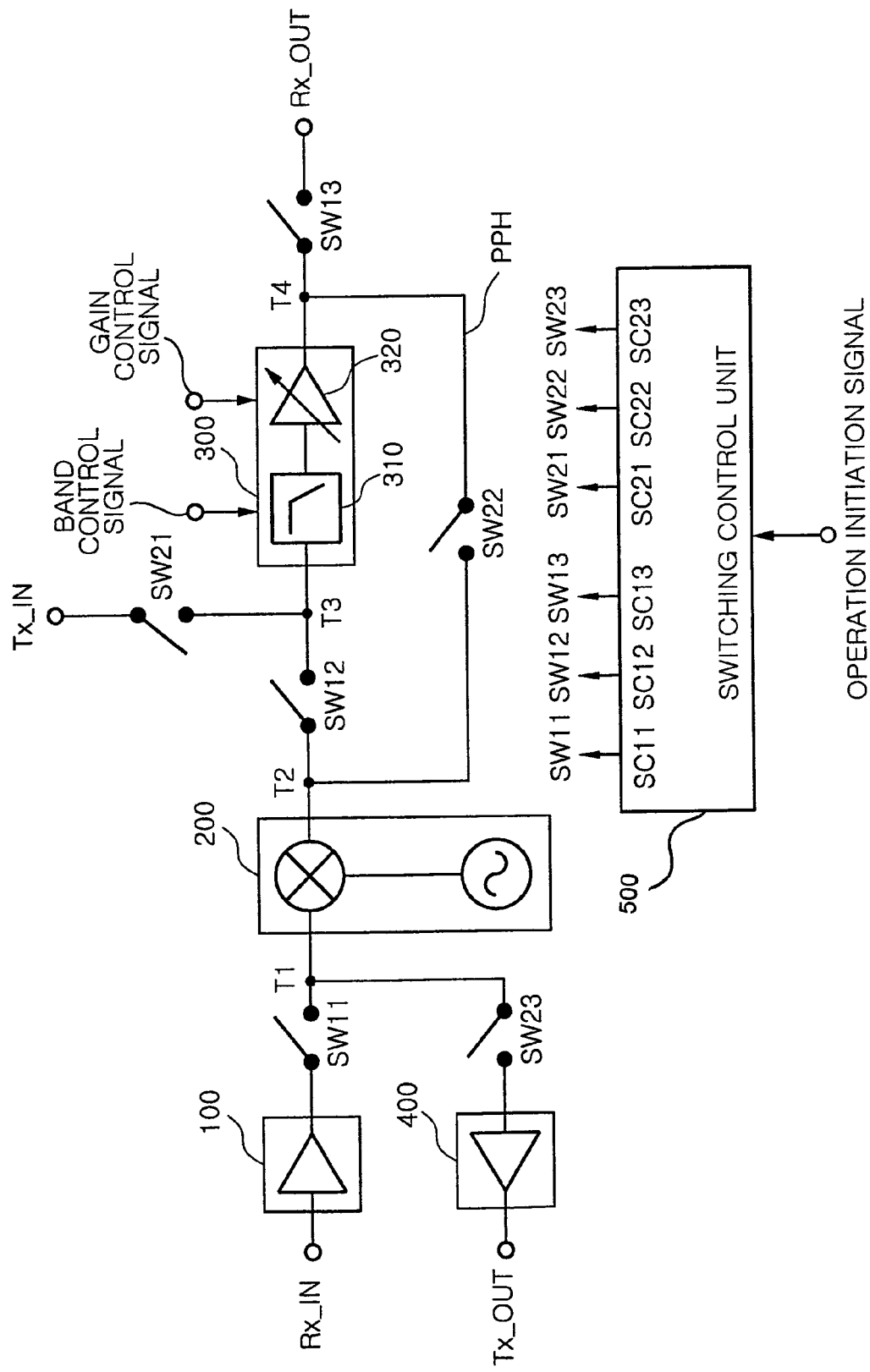
FIG. 2 is a block diagram of a wireless communication system for time division duplex according to an exemplary embodiment of the present invention.

FIG. 2 is a block diagram of a wireless communication system for time division duplex according to an exemplary embodiment of the present invention.

Referring to FIG. 2, the wireless communication system for time division duplex according to the embodiment of the present invention includes a bidirectional frequency conversion unit 200, a common intermediate frequency (IF) circuit unit 300, a receiver (Rx) switching circuit unit, and a transmitter (Tx) switching circuit unit.

The bidirectional frequency conversion unit 200 includes a first connection terminal T1 connected to an Rx input terminal Rx_IN and a Tx output terminal Tx_OUT, and a second connection terminal T2. The bidirectional frequency conversion unit 200 bidirectionally converts an Rx signal and a Tx signal.

The common IF circuit unit 300 processes an Rx signal input through the second connection terminal T2 of the bidirectional frequency conversion unit 200, or a Tx signal input through a Tx input terminal Tx_IN.

The Rx switching circuit unit includes a first Rx switch SW11 connected between the Rx input terminal Rx_IN and the first connection terminal T1 of the bidirectional frequency conversion unit 200, a second Rx switch SW12 connected between the second connection terminal T2 of the bidirectional frequency conversion unit 200 and an input terminal T3 of the common IF circuit unit 300, and a third Rx switch SW13 connected between an output terminal T4 of the common IF circuit unit 300 and an Rx output terminal Rx_OUT.

The Tx switching circuit unit includes a first Tx switch SW21 connected between the Tx input terminal $Tx_{13}IN$ and an input terminal T3 of the common IF circuit unit 300, a second Tx switch SW22 connected to a bypass path connecting the input terminal T3 of the common IF circuit unit 300 and the output terminal T4 of the common IF circuit unit 300, and a third Tx switch SW23 connected between the first connection terminal T1 of the bidirectional frequency conversion unit 200 and the Tx output terminal $Tx_{13}OUT$.

In the wireless communication system for time division duplex according to the embodiment of the present invention, the Rx switching circuit unit and the Tx switching circuit unit operate in a time-division manner.

Thus, the wireless communication system according to the embodiment of the present invention may include a switching control unit 500 controlling the Rx switching circuit unit and the Tx switching circuit unit in the time-division manner.

The switching control unit 500 provides Rx switching control signals SC11, SC12 and SC13 for the respective first to third RX switches SW11, SW12 and SW13 of the Rx switching circuit unit, and also provides Tx switching control signals SC21, SC22 and SC23 for the respective first to third Tx switches SW21, SW22 and SW23 of the Tx switching circuit unit.

Figure 3:
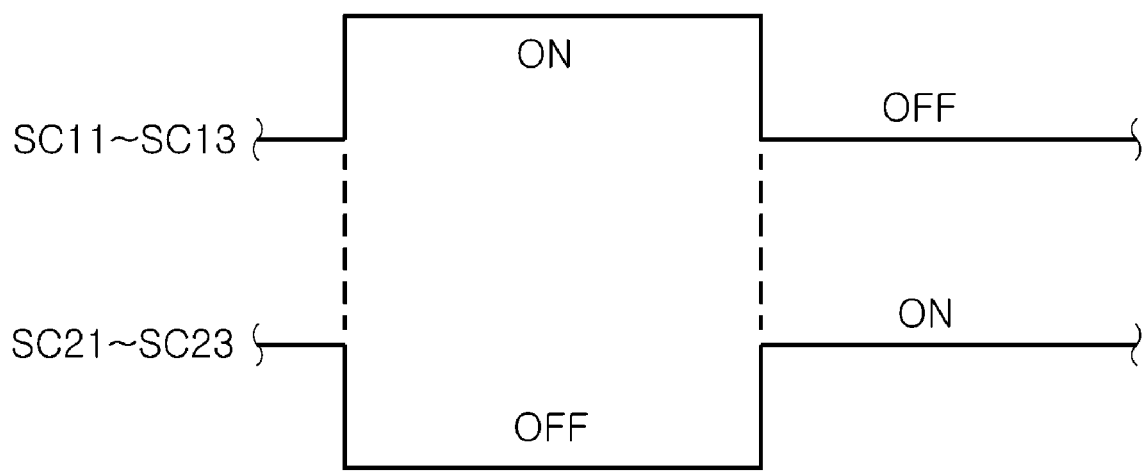
FIG. 3 is a timing diagram of a switching control signal according to an exemplary embodiment of the present invention.

FIG. 3 is a timing diagram of the switching control signals according to an exemplary embodiment of the present invention.

Referring to FIG. 3, it can be seen that the Rx switching control signals SC11, SC12 and SC13 and the Tx switching control signals SC21, SC22 and SC23 are controlled in the time-division manner.

Also, the wireless communication system according to the embodiment of the present invention may include an Rx input circuit unit 100 connected between the Rx input terminal Rx_IN and the first Rx switch SW11 and processing an Rx signal from the Rx input terminal Rx_IN, and a Tx output circuit unit 400 connected between the third Tx switch SW23 and the Tx output terminal Tx_OUT and amplifying a Tx signal from the third Tx switch SW23 and outputting the amplified Tx signal to the Tx output terminal Tx_OUT.

The common IF circuit unit 300 may include a common filter 310 passing an incoming signal in a low frequency band, and a common amplifier 320 amplifying the signal from the common filter 310.

Particularly, the common filter 310 may be configured as a variable filter that varies a passband in response to a band control signal, thereby being able to cope with an IF signal varying in frequency depending on a broadcasting method and/or a preset frequency.

The common amplifier 320 may be configured as a variable gain amplifier (VGA) that varies a gain in response to a gain control signal.

The band control signal and the gain control signal may be provided from a controller (not shown) according to an embodiment of the present invention.

The bidirectional frequency conversion unit 200 may adopt one of a direct conversion method, a double conversion method and a heterodyne conversion method.

The bidirectional frequency conversion unit 200 may include a passive mixer having a bidirectional characteristic. In this case, using the passive mixer allows a multiband to be realized with a simple circuit because it has the bidirectional characteristic and can perform a switching operation regardless of frequency.

The wireless communication system for time division duplex according to the embodiment of the present invention may be used for a direct conversion structure, a double conversion structure, a heterodyne conversion structure and a direct-conversion multi-structure. For example, if the wireless communication system for time division duplex according to the embodiment of the present invention is used for the heterodyne conversion structure, the Rx input circuit unit 100 according to the embodiment of the present invention may be configured as illustrated in FIG. 4.

Figure 4:
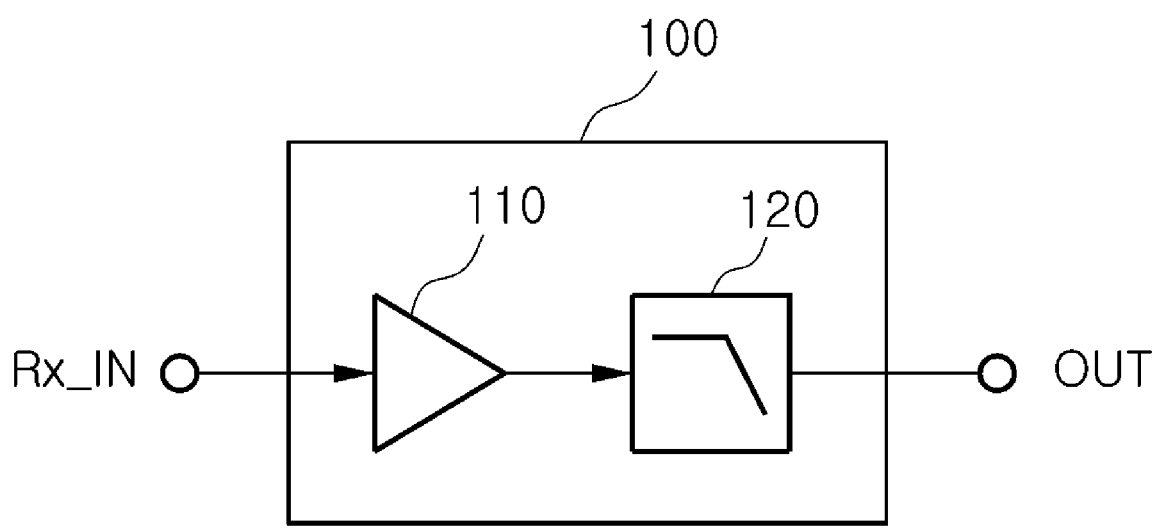
FIG. 4 is a block diagram of an Rx input circuit unit according to an exemplary embodiment of the present invention.

FIG. 4 is a block diagram of the Rx input circuit unit 100 according to an exemplary embodiment of the present invention.

Referring to FIG. 4, the Rx input circuit unit 100 includes an RX amplifier 110 amplifying an Rx signal input through the Rx input terminal Rx_IN, and an Rx filter 120 passing the Rx signal from the Rx amplifier 110 in a low frequency band.

The Rx amplifier 110 may be configured as a broadband amplifier that can pass different frequency band signals, thereby being able to cope with different frequency bands according to a broadcasting method.

Hereinafter, operations and effects of the embodiment of the present invention will now be described.

An operation of the wireless communication system for time division duplex according to the embodiment of the present invention will now be described with reference to FIGS. 2 through 4. As shown in FIG. 3, the switching control unit 500 according to the embodiment of the present invention provides, in the time-division manner, Rx switching control signals SC11, SC12 and SC13 as switching ON signals (high level) in an Rx operation, and simultaneously provides Tx switching control signals SC21, SC22 an SC23 as switching OFF signals (low level). In a Tx operation, the switching control unit 500 provides Rx switching control signals SC11, SC12 and SC13 as switching OFF signals (low level), and simultaneously provides Tx switching control signals SC21, SC22 and SC23 as switching ON signals (high level).

First, the Rx operation of the wireless communication system according to the embodiment of the present invention will now be described.

Referring to FIG. 2, in the Rx operation, the switching control unit 500 provides Rx switching control signals SC11, SC12 and SC13 as switching ON signals (high level), and simultaneously provides Tx switching control signals SC21, SC22 and SC23 as switching OFF signals (low level).

Thus, all the first, second and third switches SW11, SW12 and SW13 of the Rx switching circuit unit are switched ON, thereby performing the Rx operation of receiving an Rx signal. This will now be described in further detail.

When the Rx operation is selected in such a manner, an Rx signal input through the Rx input terminal Rx_IN sequentially passes through the Rx input circuit unit 100, the first Rx switch SW1, the bidirectional frequency conversion unit 200, the second Rx switch SW12 and the common IF circuit unit 300, and then is output through the Rx output terminal Rx_OUT.

Referring to FIG. 4, the Rx input circuit unit 100 includes the Rx amplifier 110 and the Rx filter 120. In this case, the Rx amplifier 110 amplifies an Rx signal input through the Rx input terminal $Rx_{13}IN$ and outputs the amplified Rx signal to the Rx filter 120. The Rx filter 120 passes the Rx signal from the Rx amplifier 110 in a preset low frequency band, and outputs the Rx signal to the bidirectional frequency conversion unit 200 through the first Rx switch SW11.

If the Rx amplifier 110 is implemented as a broadband amplifier, the Rx amplifier 110 can pass different frequency bands, for example, Zigbee 900 MHz and 2 GHz, WLAN 2 GHz and 5 GHz, Zigbee 900 MHz and WLAN 5 GHz, and Zigbee 2 GHz and WLAN 5 GHz.

The bidirectional frequency conversion unit 200 includes a passive mixer and an oscillator. The passive mixer mixes the Rx signal from the Rx input circuit unit 100 with an oscillation signal from the oscillator, thereby converting the Rx signal into an IF Rx signal.

The bidirectional frequency conversion unit 200 may employ one conversion method selected from a direct conversion method, a double conversion method and a heterodyne conversion method.

Using the passive mixer allows for implementation of a simple bidirectional frequency conversion unit because the passive mixer, as mentioned above, has a bidirectional characteristic and can perform a switching operation regardless of the frequency.

When the common IF circuit unit 300 includes the common filter 310 and the common amplifier 320, the common filter 310 passes the input signal in a low frequency band and outputs the signal to the common amplifier 320. Thereafter, the common amplifier 320 amplifies the signal from the common filter 310.

The common filter 310 may be configured as a variable filter that can vary its passband according to the Rx operation and the Tx operation.

If the common filter 310 is configured as a variable filter that varies a passband in response to a band control signal, the common filter 310 may cope with an IF signal frequency of which may be set differently according to a broadcasting method.

If the common amplifier 320 is configured as a variable gain amplifier (VGA) that varies a gain in response to a gain control signal, the common amplifier 320 can satisfy different levels demanded for respective multi-band, multi-application systems.

Hereinafter, the Tx operation of the wireless communication system according to the embodiment of the present invention will now be described.

Referring to FIG. 2, in the Tx operation, the switching control unit 500 provides Rx switching control signals SC11, SC12 and SC13 as switching OFF signals (low level), and simultaneously provides Tx switching control signal SC21, SC22 and SC23 as switching ON signals (high level).

Thus, all the first, second and third switches SW21, SW22 and SW23 of the Tx switching circuit unit are switched ON, thereby performing the Tx operation of transmitting a Tx signal. This will now be described.

When the Tx operation is selected, a Tx signal input through the Tx input terminal Tx_IN sequentially passes through the first Tx switch SW21, the common IF circuit unit 300, the second Tx switch SW22, the bidirectional frequency conversion unit 200, the third Tx switch SW23 and the Tx output circuit unit 400, and then is output through the Tx output terminal Tx_OUT.

The bidirectional frequency conversion unit 200 includes the passive mixer and the oscillator. The passive mixer mixes the signal received from the common IF circuit unit 300 with an oscillation signal from the oscillator to convert the signal into an RF Tx signal.

As described so far, according to the embodiments of the present invention, a frequency conversion circuit and an IF circuit among unit circuits constituting a transceiver are implemented as common multiband units. Accordingly, miniaturization, low current and low costs can be achieved by using a minimum unit circuit, so that a low-priced chip can be manufactured.

Also, if a variable filter is used as the common filter a variable gain amplifier is used as the common amplifier, and a broadband amplifier is used as the RF amplifier 110, the same multi-band, multi-application systems can be covered for, e.g., Zigbee communication and wireless local area network (WLAN) communication.

According to the embodiment of the present invention, the wireless communication system for time division duplex can achieve miniaturization, low power consumption and low costs by using a frequency conversion circuit including a mixer and an IF circuit for both transmitter and receiver.

While the present invention has been shown and described in connection with the exemplary embodiments, it will be apparent to those skilled in the art that modifications and variations can be made without departing from the spirit and scope of the invention as defined by the appended claims.

What is claimed is:

1. A wireless communication system for time division duplex comprising:
    a bidirectional frequency conversion unit bidirectionally converting a receiver (Rx) signal and a transmitter (Tx) signal, and including a first connection terminal connected to an Rx input terminal and a Tx output terminal, and a second connection terminal;
    a common intermediate frequency (IF) circuit unit processing an Rx signal input through the second connection terminal of the bidirectional frequency conversion unit or a Tx signal input through a Tx input terminal;
    an Rx switching circuit unit switched ON in an Rx operation, and including a first Rx switch connected between the Rx input terminal and the first connection terminal of the bidirectional frequency conversion unit, a second Rx switch connected between the second connection terminal of the bidirectional frequency conversion unit and an input terminal of the common IF circuit unit, and a third Rx switch connected between an output terminal of the common IF circuit unit and an Rx output terminal; and
    a Tx switching circuit unit switched ON in a Tx operation, and including a first Tx switch connected between the Tx input terminal and the input terminal of the common IF circuit unit, a second Tx switch connected to a bypass path connecting the input terminal of the common IF circuit unit with the output terminal of the common IF circuit unit, and a third Tx switch connected between the first connection terminal of the bidirectional frequency conversion unit and the Tx output terminal,
    where in the Rx switching circuit unit and the Tx switching circuit unit operate in a time-division manner.

2. The wireless communication system for time division duplex of claim 1, further comprising a switching control unit controlling the Rx switching circuit unit and the Tx switching circuit unit in a time-division manner.

3. The wireless communication system for time division duplex of claim 1, further comprising an Rx input circuit unit connected between the Rx input terminal and the first Rx switch to process an Rx signal input from the Rx input terminal.

4. The wireless communication system for time division duplex of claim 1, further comprising a Tx output circuit unit connected between the third Tx switch and the Tx output terminal to amplify a Tx signal input through the third Tx switch and output the Tx signal amplified to the Tx output terminal.

5. The wireless communication system for time division duplex of claim 1, wherein the common IF circuit unit comprises:
    a common filter passing an input signal in a low frequency band; and
    a common amplifier amplifying a signal input from the common filter.

6. The wireless communication system for time division duplex of claim 5, wherein the common filter is a variable filter varying a passband in response to a band control signal.

7. The wireless communication system for time division duplex of claim 5, wherein the common amplifier is a variable gain amplifier varying a gain in response to a gain control signal.

8. The wireless communication system for time division duplex of claim 1, wherein the bidirectional frequency conversion unit uses one of a direct conversion method, a double conversion method and a heterodyne conversion method.

9. The wireless communication system for time division duplex of claim 2, wherein the Rx input circuit unit comprises:
    an Rx amplifier amplifying an Rx signal input through the Rx input terminal; and
    an Rx filter passing the Rx signal from the Rx amplifier in a preset low frequency band.

10. The wireless communication system for time division duplex of claim 9, wherein the Rx amplifier is a broadband amplifier passing different frequency band signals.

11. The wireless communication system for time division duplex of claim 1, wherein the bidirectional frequency conversion unit comprises a passive mixer having a bidirectional characteristic.

* * * * *